US011946301B2

(12) United States Patent
Irgang et al.

(10) Patent No.: US 11,946,301 B2
(45) Date of Patent: Apr. 2, 2024

(54) ARRANGEMENT FOR GUIDING A SLIDING DOOR OR FOLDING SLIDING DOOR

(71) Applicant: Julius Blum GmbH, Hoechst (AT)

(72) Inventors: Markus Irgang, Altach (AT); Guenter Schwarzmann, Dornbirn (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 17/843,068

(22) Filed: Jun. 17, 2022

(65) Prior Publication Data

US 2022/0316252 A1 Oct. 6, 2022

Related U.S. Application Data

(63) Continuation of application No. PCT/AT2020/060454, filed on Dec. 11, 2020.

(30) Foreign Application Priority Data

Dec. 19, 2019 (AT) .............................. A 51121/2019

(51) Int. Cl.
*E05D 15/26* (2006.01)
*E05D 15/58* (2006.01)

(52) U.S. Cl.
CPC ........... *E05D 15/264* (2013.01); *E05D 15/58* (2013.01); *E05Y 2800/102* (2013.01); *E05Y 2900/20* (2013.01); *E05Y 2900/212* (2013.01)

(58) Field of Classification Search
CPC . E05D 15/063; E05D 15/264; E05D 15/0665; E05D 15/0604; E05D 15/58;
(Continued)

(56) References Cited

U.S. PATENT DOCUMENTS 4,872,287 A 10/1989 Block
6,052,867 A * 4/2000 Haab .................... E05D 15/063 16/99
(Continued)

FOREIGN PATENT DOCUMENTS

AT 008 702 11/2006
AT 521260 12/2019
(Continued)

OTHER PUBLICATIONS

International Search Report dated May 4, 2021 in International (PCT) Application No. PCT/AT2020/060454.
(Continued)

*Primary Examiner* — Justin B Rephann
(74) *Attorney, Agent, or Firm* — Wenderoth, Lind & Ponack, L.L.P.

(57) ABSTRACT

An arrangement for guiding a door on a furniture wall, includes a guide to be secured on the furniture wall, a carrier on which the door is to be secured, and a guide body. The carrier is connected to the guide body such that the carrier and the guide body are coupled for movement, and via which the carrier is moveably mounted on the guide. A securing device includes a first mounting body that is connected to the carrier or the guide body, a second mounting body that is connected to the guide or configured to be connected to the furniture wall, and a securing element. The securing element is configured to fix the two mounting bodies in a secure position relative to one another and release the two mounting bodies in a release position, such that the two mounting bodies are movable relative to one another.

49 Claims, 15 Drawing Sheets

(58) Field of Classification Search

CPC .. E05D 13/04; E05F 5/003; E05F 1/16; E05F 3/00; E05F 3/227; E05Y 2800/102; E05Y 2900/20; E05Y 2900/212

See application file for complete search history.

(56) References Cited

U.S. PATENT DOCUMENTS

| | | | | |
|---|---|---|---|---|
| 6,516,575 | B2 * | 2/2003 | Haab | E05D 13/04 52/64 |
| 7,686,063 | B2 * | 3/2010 | Kirby | A47H 1/04 160/331 |
| 8,402,606 | B1 * | 3/2013 | Tsai | E05F 3/18 16/49 |
| 9,027,283 | B2 * | 5/2015 | Beyerle | E05F 3/00 49/425 |
| 9,894,996 | B1 | 2/2018 | Grela | |
| 10,145,158 | B2 | 12/2018 | Grela et al. | |
| 10,563,442 | B2 | 2/2020 | Pelekanos | |
| 10,876,340 | B2 | 12/2020 | Rupp et al. | |
| 11,391,076 | B2 | 7/2022 | Rupp et al. | |
| 11,428,034 | B2 | 8/2022 | Rupp et al. | |
| 2002/0178668 | A1 | 12/2002 | Haab et al. | |
| 2009/0119998 | A1 * | 5/2009 | Tarrega Lloret | E05F 5/003 49/57 |
| 2010/0293859 | A1 * | 11/2010 | Nezu | E05F 1/16 49/358 |
| 2013/0160240 | A1 * | 6/2013 | Kenny | E05D 15/0626 16/89 |
| 2013/0232878 | A1 * | 9/2013 | Bortoluzzi | E05D 15/58 49/252 |
| 2017/0247921 | A1 | 8/2017 | Pelekanos | |
| 2018/0125236 | A1 | 5/2018 | Grela et al. | |
| 2018/0128032 | A1 | 5/2018 | Karle et al. | |
| 2019/0330896 | A1 | 10/2019 | Rupp et al. | |
| 2019/0330898 | A1 * | 10/2019 | Rupp | E05D 15/264 |
| 2020/0018107 | A1 | 1/2020 | Rupp et al. | |
| 2020/0040632 | A1 | 2/2020 | Rupp et al. | |
| 2021/0246700 | A1 | 8/2021 | Hoffmann | |

FOREIGN PATENT DOCUMENTS

| | | | |
|---|---|---|---|
| CN | 101389881 | 3/2009 | |
| DE | 933 584 | 9/1955 | |
| DE | 28 47 578 | 5/1980 | |
| DE | 29 20 005 | 11/1980 | |
| DE | 102005030757 | 1/2007 | |
| EP | 1 247 930 | 10/2002 | |
| EP | 2 607 580 | 6/2013 | |
| JP | 57-20490 | 2/1982 | |
| JP | 63-23471 | 2/1988 | |
| JP | 10-280792 | 10/1998 | |
| JP | 2002-339646 | 11/2002 | |
| JP | 3098936 | 3/2004 | |
| JP | 2006-52555 | 2/2006 | |
| JP | 2013-249588 | 12/2013 | |
| JP | 2019-206809 | 12/2019 | |
| JP | 2020-519788 | 7/2020 | |
| WO | 2016/046733 | 3/2016 | |
| WO | 2018/129570 | 7/2018 | |
| WO | WO-2018129568 A1 * | 7/2018 | E05D 15/0604 |
| WO | 2018/204950 | 11/2018 | |

OTHER PUBLICATIONS

English machine translation of abstract of Applicant's own unpublished registration AT 50618/2019 (cited in specification).

* cited by examiner

ARRANGEMENT FOR GUIDING A SLIDING DOOR OR FOLDING SLIDING DOOR

BACKGROUND OF THE INVENTION

The invention relates to an arrangement for guiding a sliding door or folding sliding door. Furthermore, the invention relates to a piece of furniture with at least one such arrangement, as well as a method for installing such an arrangement.

Arrangements for guiding a sliding door or folding sliding door are already known from the state of the art. The applicant's own AT 50618/2019 discloses an arrangement for guiding a sliding door or folding sliding door with a compensation device for compensating for a tilt moment acting on the sliding or folding sliding door.

A disadvantage of such an arrangement is that both the installation of the arrangement and the transport of the arrangement prove to be difficult, as a carrier of the arrangement is mounted on a furniture wall freely movable via a guide system. The carrier thus always has to be held in position manually by an installer in the case of installation; for transport of the arrangement the carrier or the sliding or folding sliding door has to be secured against a displacement.

SUMMARY OF THE INVENTION

The object of the present invention is to remedy the disadvantages of the state of the art and to specify an arrangement for guiding a sliding door or folding sliding door that is improved compared with the state of the art. A further object is to specify a piece of furniture with at least one such arrangement as well as a method for installing such an arrangement.

With regard to the arrangement, at least one securing device is provided which comprises a first installing body that is or can be connected to the carrier and/or to the guide body, a second installing body that is or can be connected to the guide and/or to the furniture wall and at least one securing element, wherein the at least one securing element fixes the two installing bodies relative to each other in a securing position and releases them in a release position, with the result that the two installing bodies are movable relative to each other.

If the securing device is in a securing position, the installing bodies, and thus also the at least one guide or the furniture wall and the carrier or the folding or folding sliding door, are fixed relative to each other. In this position, the arrangement can be transported or installed without trouble. If the arrangement is at its destination or the arrangement is ready-installed, the securing device can be transferred to a release position. The installing bodies, and thus also the guide or the furniture wall and the carrier or the sliding or folding sliding door, are now movable relative to each other.

A securing device according to the invention is advantageous compared with securing devices known from the state of the art (screws, split pins, etc.) in that the entire securing device can remain on the arrangement. Thus, no screws or split pins etc. need to be disposed of or collected, stored, etc.

It is furthermore advantageous that a securing device according to the invention can act as an insertion aid for the insertion of the guide bodies into the guide during the installation of the carrier and the at least one guide body on the at least one guide or on the furniture wall.

With respect to a method for installing an arrangement according to the invention, the following method steps are provided:

- the at least one guide is fastened on the furniture wall,
- the carrier is connected to the guide via the at least one guide body,
- the second installing body of the at least one securing device is connected to the guide and/or to the furniture wall, and
- the at least one securing device is transferred from the securing position to the release position.

Furthermore, a piece of furniture with at least one furniture wall, at least one sliding door or folding sliding door and at least one arrangement according to the invention for guiding the at least one sliding door or folding sliding door on the at least one furniture wall is provided, preferably wherein the at least one furniture wall at least partially delimits a shaft-shaped cavity of the piece of furniture, in which the at least one sliding door or folding sliding door can be arranged.

According to a preferred embodiment of the invention, the at least one securing device comprises an energy storage mechanism, preferably a spring, by which a force can be applied to the securing element. It is thereby possible to prevent an unintentional transfer of the securing device from a securing position to a release position or from a release position to a securing position due to vibrations or the like.

It has furthermore proved to be advantageous if the first installing body and/or the second installing body and/or the securing element is/are formed in one piece and/or if the first installing body and/or the second installing body and/or the securing element is/are formed in several parts. An embodiment in which the installing bodies are formed in one piece and the securing element is formed in several parts is advantageous in particular.

The first installing body and/or the second installing body and/or the securing element can be made of different materials, preferably plastic and/or metal. Thus, for each component the material that is most suitable for that component with respect to the required criteria can be provided.

Preferably, the securing device has an actuating element for actuating the securing device, wherein the actuating element is preferably arranged on the securing element.

It has proved to be particularly advantageous if the actuating element is formed in the form of a screw head drive. A simple and intuitive actuation of the securing device, thus a transfer of the securing device from a securing position to a release position or vice versa, is thereby possible. In principle, however, the actuating element can be designed in any manner, for example in the form of a bolt, a press stud or the like.

According to a further embodiment of the invention, the at least one securing element is formed as a pivot lever, and/or comprises at least one ramp, via which the at least one securing element can be traversed by the first installing body. Such an alternative embodiment of the securing element makes it possible to select the appropriate securing element for each situation.

At least one setting device for adjusting the at least one guide relative to the furniture wall can furthermore be provided. The setting device can comprise at least one installing device that can be fastened on the furniture wall and at least one coupling device that can be coupled to the at least one guide, wherein at least one, preferably rotatably mounted, actuating element can be provided, with which the at least one coupling device can be adjusted relative to the installing device.

According to a further aspect of the invention, at least two guides, at least two guide bodies and at least two securing devices can be provided. A stable and secure guiding of the sliding or folding sliding doors on the furniture wall is thereby achieved.

It has proved to be particularly advantageous if the arrangement comprises a compensation device for compensating for a tilt moment of the carrier or the sliding door or folding sliding door arranged thereon about a tilt axis.

The compensation device can have at least one cable-pull device and/or at least one pivot lever mechanism, wherein the at least one pivot lever mechanism comprises at least two pivot levers connected to each other in an articulated manner, which are pivotable relative to each other during a movement of the carrier by means of the two guides and guide bodies along the furniture wall.

An arrangement for guiding a sliding door or folding sliding door with improved stability and rigidity is thereby achieved.

According to a further aspect of the invention, the compensation device is at least partially, preferably completely, pre-installed on the carrier in a delivery condition of the arrangement.

This makes it much easier to install an arrangement according to the invention. If the at least one securing device is also at least partially, preferably completely, pre-installed on the carrier in a delivery condition of the arrangement, the installation is simplified again.

With regard to a method according to the invention, before the at least one securing device is transferred from the securing position to the release position, the at least two pivot levers, connected to each other in an articulated manner, of the at least one pivot lever mechanism are transferred from a parallel position, in which the at least two pivot levers are arranged substantially parallel to each other, to at least one spread position, in which the at least two pivot levers form an angle greater than 0° to each other, preferably wherein at least one cable of the at least one cable-pull device is unwound from a cable supply.

Before the at least one securing element is transferred from the securing position to the release position, a cable tension of the at least one cable of the at least one cable-pull device can be set.

Moreover, it can be provided that a sliding door or folding sliding door is installed on the carrier in a further method step.

BRIEF DESCRIPTION OF THE DRAWINGS

Further details and advantages of the invention are explained in more detail below by means of the description of the figures with reference to the drawings. There are shown in.

DETAILED DESCRIPTION OF THE INVENTION

Figure 1A:
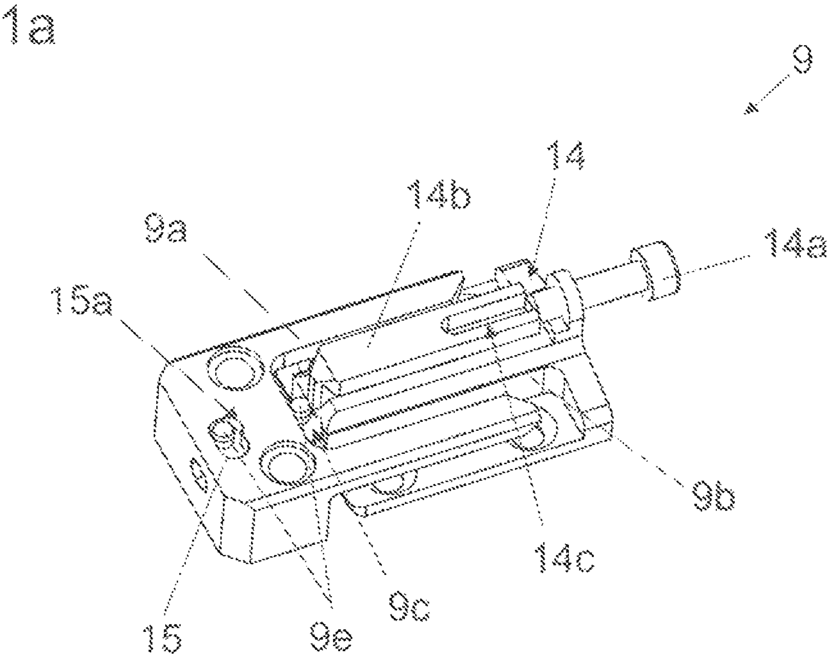
FIG. 1*a* is a perspective view of a securing device of an arrangement according to the invention in a first position.
Figure 1B:
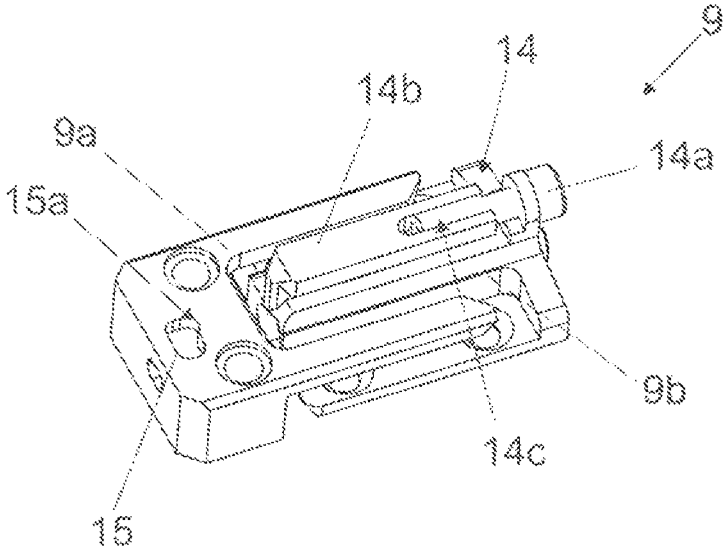
FIG. 1*b* is a perspective view of a securing device of an arrangement according to the invention in a second position.

FIG. 1 shows a perspective view of a securing device of an arrangement according to the invention in a first position. The first installing body 9*a*, the second installing body 9*b* and the securing element 9*c* can be seen. The securing element 9*c* has two securing pins 9*e*, wherein one of the securing pins 9*e* engages in the opening 15. In principle, however, any number of securing pins 9*e* can be provided.

If one of the two installing bodies 9*a* or 9*b* is displaced relative to the other installing body 9*a* or 9*b*, this movement is impeded by the securing pins 9*e* of the securing element 9*c*. As a force can be applied to the securing element 9*c* by an energy storage mechanism 16, not visible, a securing pin 9*e* can be held in a recess 15*a* of the opening 15 and thus an unintentional actuation of the securing element 9*c* can be prevented.

The spreading device 14 comprises an actuating device 14*a* designed in the form of a screw, a profile 14*b* and a spreading region 14*c*. The profile 14*b* can be inserted into a negative profile 4*a* of the profile 14*b* on the guide 4. Through actuation of the actuating device 14*a*, the profile 14*b* is spread in the spreading region 14*c* and thus produces a friction-locking connection between the negative profile 4*a* and the profile 14*b* and thus between the guide 4 and the second installing body 9*b*. The actuating element can, in principle, be formed in any manner, for example as a spreader wedge.

In the present embodiment example, the profile is formed as a T-shaped profile. However, any suitable type of profile can be provided, such as for example an L-shaped profile, a triangular profile, a rectangular profile, a circular or oval profile or a polygonal profile. The profile furthermore has an insertion aid in the form of a tapering.

It can be seen in FIG. 2 that the securing element 9*c* is not actuated. Thus, no securing pin 9*e* of the securing element 9*c* engages in the opening 15. A displacement of the two installing bodies 9*a*, 9*b* relative to each other is thus possible. A force is again applied to the securing element 9*c* by the energy storage mechanism 16 and the former is thus secured against an unintentional actuation.

It can be seen that the actuating element 14*a* is actuated. The profile 14*b* is spread in the spreading region 14*c*.

Figure 2A:
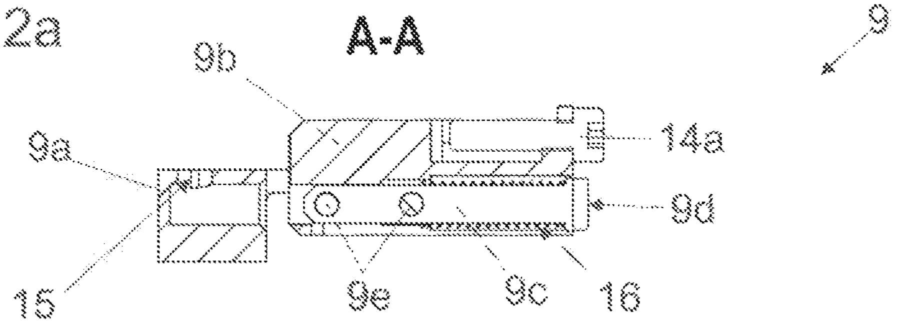
FIG. 2*a* is a sectional representation of a securing device of an arrangement according to the invention in a second position in accordance with the section line A-A in FIG. 2*b*.
Figure 2B:
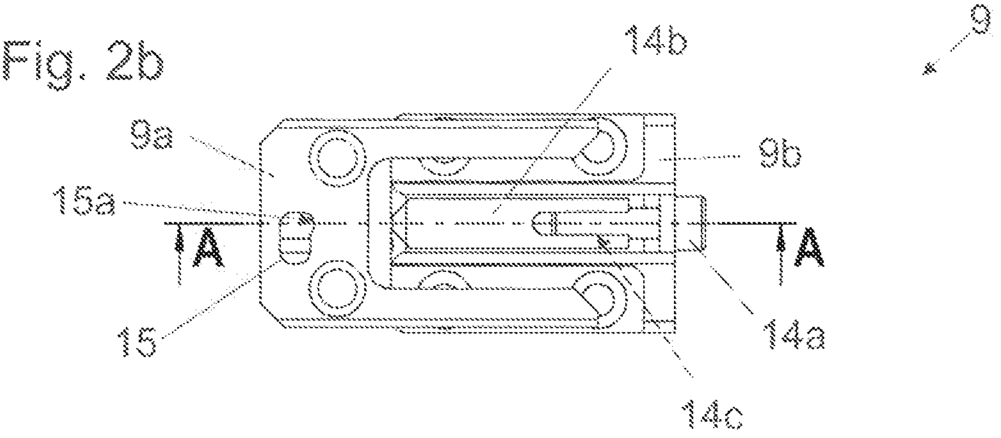
FIG. 2*b* is a top view of a securing device of an arrangement according to the invention in a second position.

FIG. 2*a* shows a sectional representation of the securing element 9 in accordance with the section line A-A in FIG. 2*b*. It can be seen that the securing element 9*c* is not actuated. The energy storage mechanism 16 designed in the form of a compression spring prevents an inadvertent actuation of the securing element 9*c*. The actuating element 14*a* is actuated.

The securing element 9 is represented again in FIG. 2*b* in a top view.

Figure 2C:
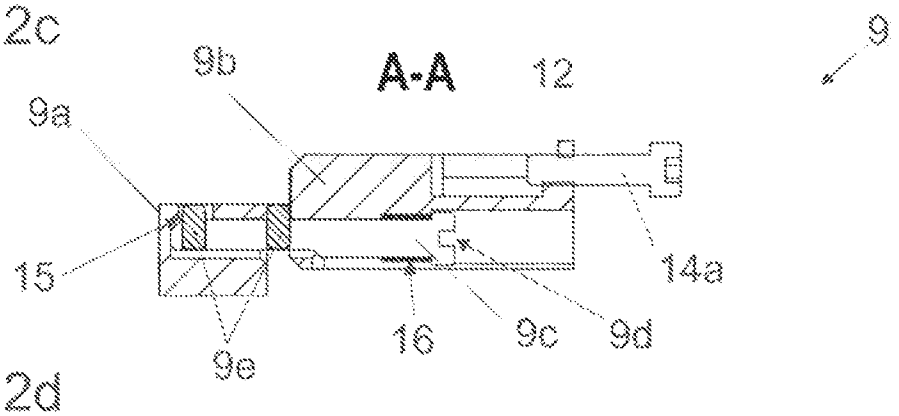
FIG. 2*c* is a sectional representation of a securing device of an arrangement according to the invention in a first position in accordance with the section line A-A in FIG. 2*d*.
Figure 2D:
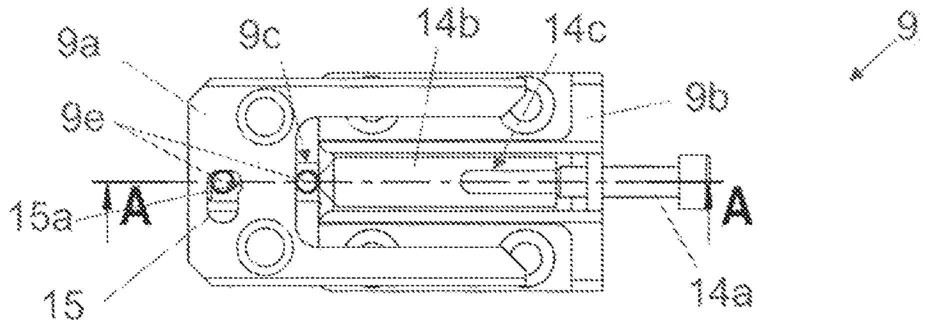
FIG. 2*d* is a top view of a securing device of an arrangement according to the invention in a first position.

FIG. 2*c* shows a sectional representation of the securing element 9 in accordance with the section line A-A in FIG. 2*d*. It can be seen that the securing element 9*c* is actuated. The energy storage mechanism 16 designed in the form of a compression spring is compressed. An inadvertent actuation of the securing element 9*c* is prevented through the engagement of a securing pin 9*e* in the recess 15*a* of the opening 15. The actuating element 14*a* is not actuated.

The securing element 9 is represented again in FIG. 2*d* in a top view.

Figure 3:
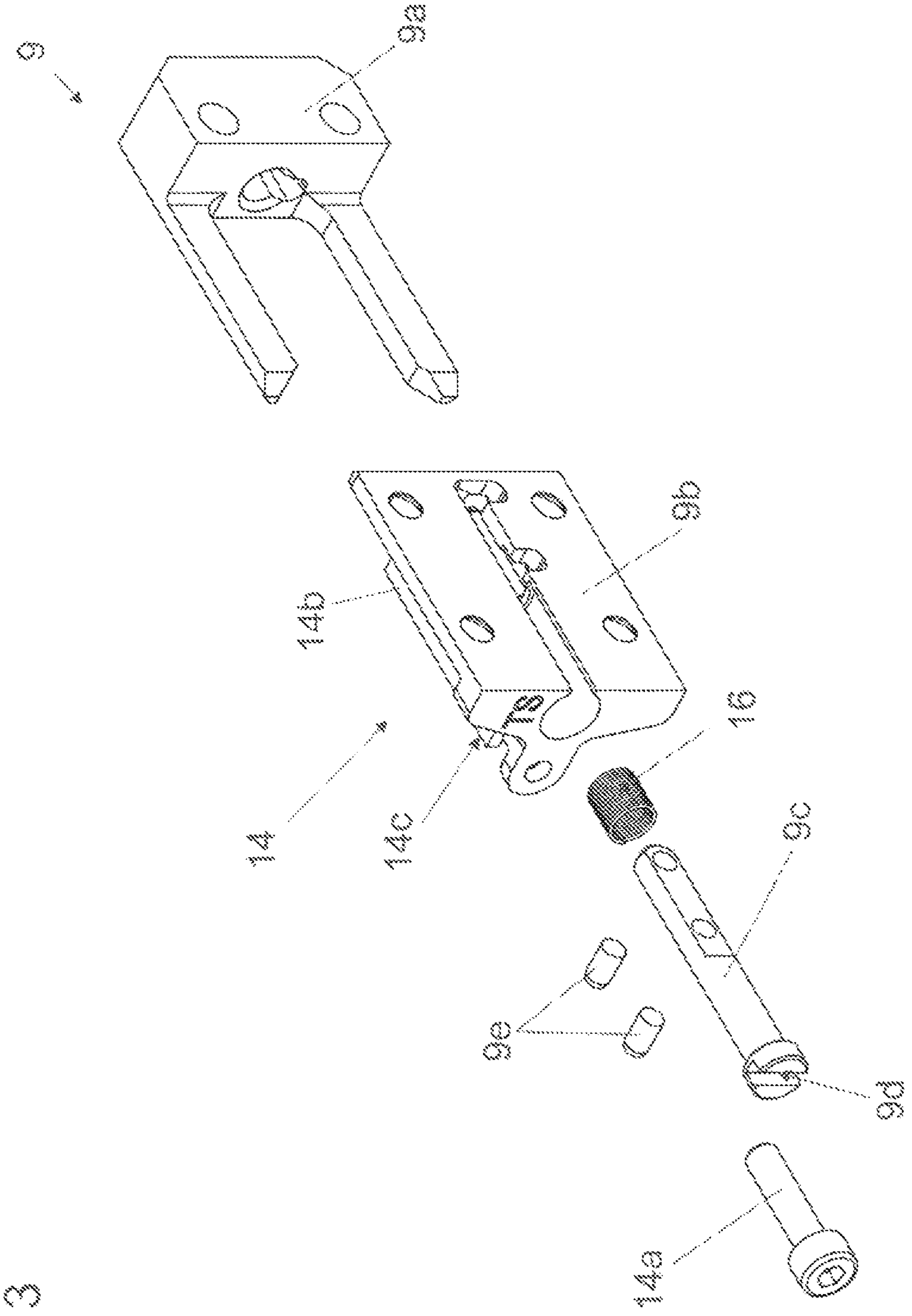
FIG. 3 is an exploded representation of a securing device of an arrangement according to the invention.

FIG. 3 shows the securing element 9 in an exploded representation. The first and second installing bodies 9*a*, 9*b*, the securing element 9*c*, the actuating element 9*d* and the securing pins 9*e* can be seen.

It can be seen from this figure that the actuating element 9*d* is designed in the form of a screw head drive, in particular in the form of a slot. The actuation of the actuating element 9*d* is thus effected by twisting the securing element 9*c*.

The fastening device 14, the actuating device 14*a*, the profile 14*b*, the spreading region 14*c* and the energy storage mechanism 16 are furthermore represented.

A method according to the invention is to be explained in general with reference to FIGS. 4*a* to 4*e*.

In a method according to the invention, in the present embodiment example, two guides 4, 5 are fastened on the furniture wall 3 spaced apart from each other by a vertical distance in a first step. The fastening of the guides 4, 5 on the furniture wall 3 is preferably effected by screwing, but all other suitable methods are also conceivable.

In a further step, a carrier 8 is arranged on the guides 4, 5 via guide bodies 6, 7 pre-installed on the carrier 8. Fastening devices 9 serve as an insertion aid for inserting the guide bodies 6, 7 into the guides 4, 5. This method step is represented in a perspective front view in FIG. 4*a*.

Figure 4A:
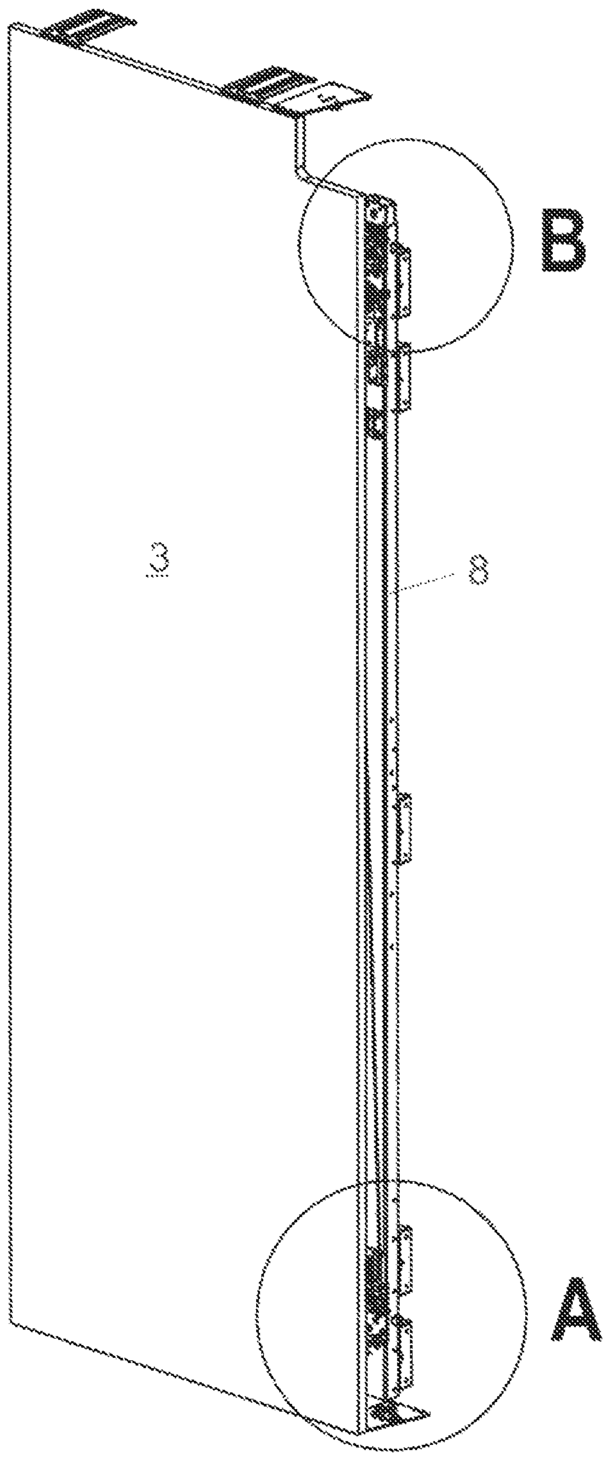
FIG. 4*a* is a perspective front view of a step of a method for installing an arrangement according to the invention.
Figure 5A:
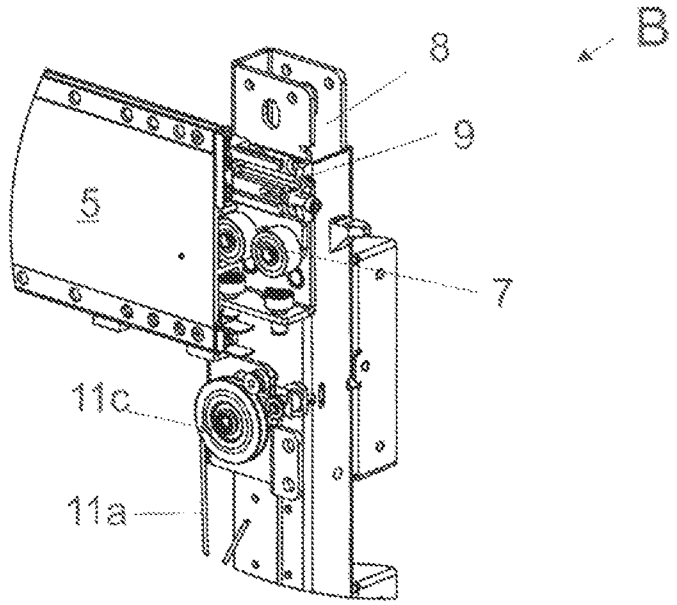
FIG. 5*a* shows a detail B from FIG. 4*a*.
Figure 5B:
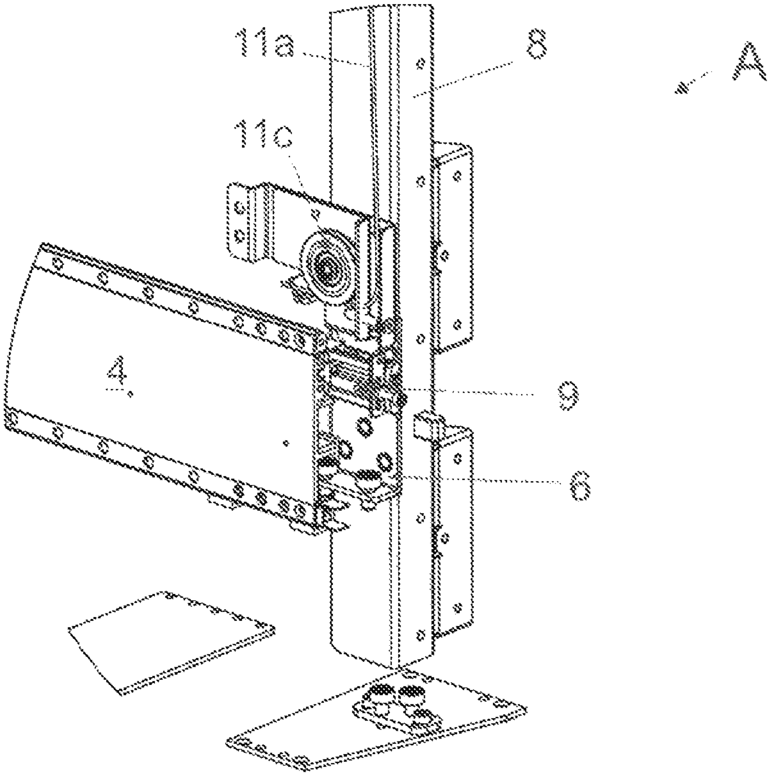
FIG. 5*b* shows a detail A from FIG. 4*a*.

The details A and B marked in FIG. 4*a* are represented in FIGS. 5*a* and 5*b*.

In a further method step, the carrier 8 is fixed on the guide rails 4, 5 via the securing devices 9. In the course of this method, a deflection device 11*b*, which comprises the cable supply (not represented), is also installed on the furniture wall 3 via the guide 4.

In a further method step, a pivot lever mechanism 12 pre-installed on the carrier 8 and arranged in the carrier 8 is transferred out of the interior of the carrier 8 and into a spread position, in which pivot levers 12*a*, 12*b* form an angle greater than 0° to each other. A cable-pull device 11 is also already pre-installed on the carrier 8. In principle, however, it is also possible for no parts of the arrangement 1 to be pre-installed.

A further deflection device 11*b* is arranged on one end of the first pivot lever 12*a*. The pre-installed cable 11*a* therefore moves with the pivot levers 12*a*, 12*b* through the deflection devices 11*b*. Cable 11*a* is thereby taken from the cable supply, not depicted.

In a further method step, the pivot lever mechanism 12 is completely swiveled out and fastened on the first guide 5 via one end of the first pivot lever 12*a*. In the course of this, the cable 11 is completely taken from the cable supply. The cable 11 is then tensioned via a cable-tensioning device, not visible, in order to ensure the best possible stability and rigidity of the arrangement 1.

Figure 4B:
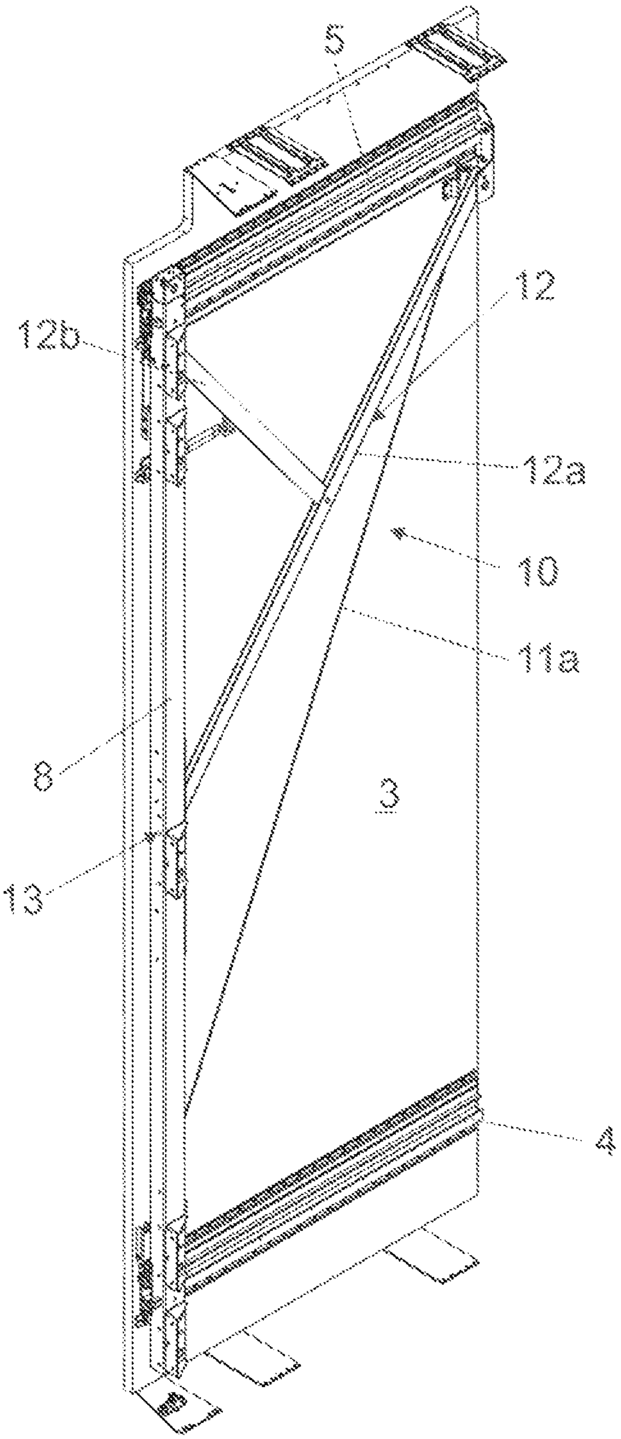
FIG. 4*b* is a perspective rear view of a further step of a method for installing an arrangement according to the invention.

The state of the arrangement 1 after these method steps is represented in FIG. 4*b*. The carrier 8 is furthermore fixed to the guides 4, 5 by the securing devices 9. Not visible in the carrier 8, a guide 13 is arranged for the displaceable mounting of one end of the first pivot lever 12*a*.

Figure 4C:
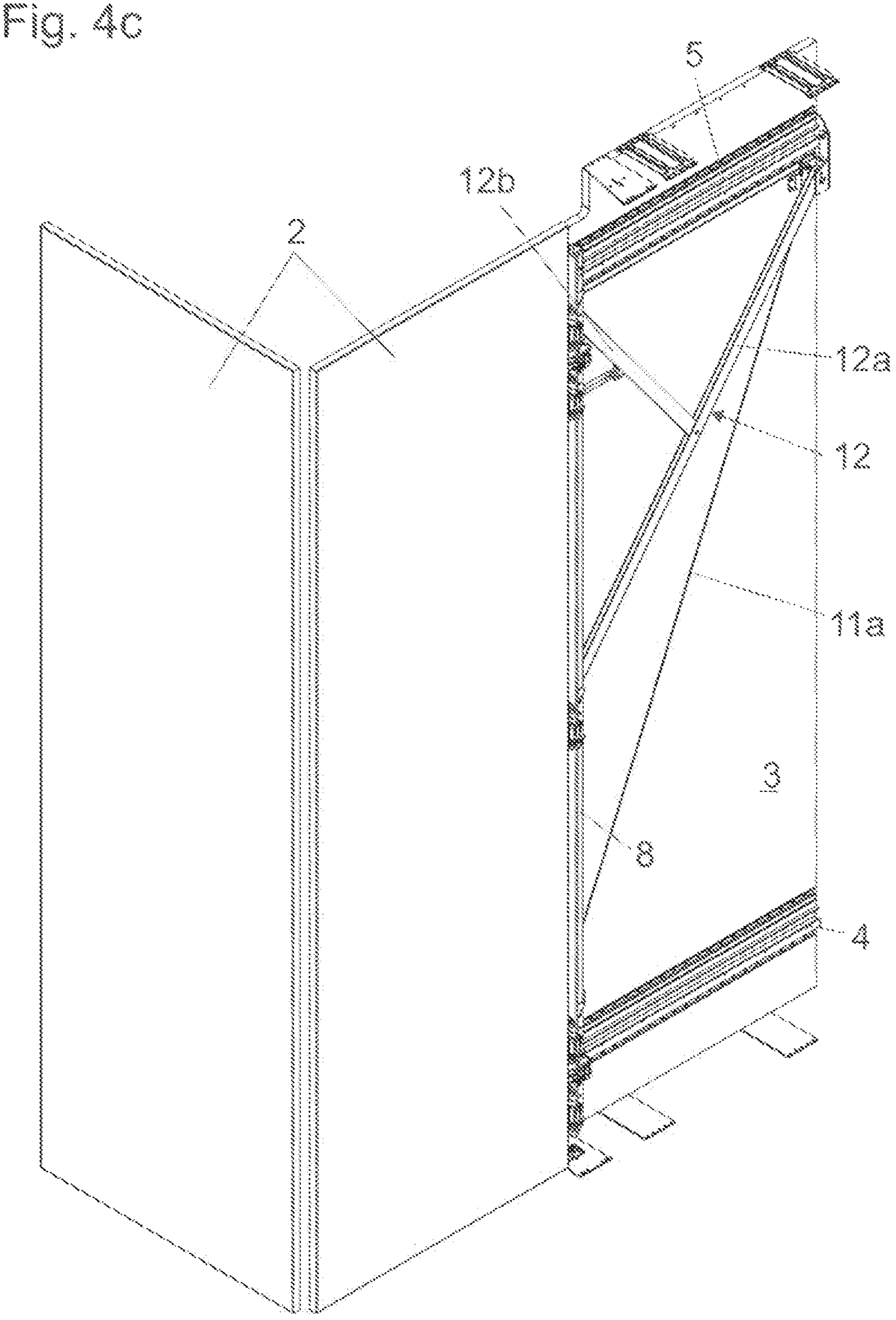
FIG. 4*c* is a perspective rear view of a further step of a method for installing an arrangement according to the invention.

A further method step, in which a folding sliding door 2 is installed on the carrier 8, is represented in FIG. 4*c*. In principle, however, any suitable embodiment of a door for use with an arrangement 1 according to the invention is conceivable.

Figure 4D:
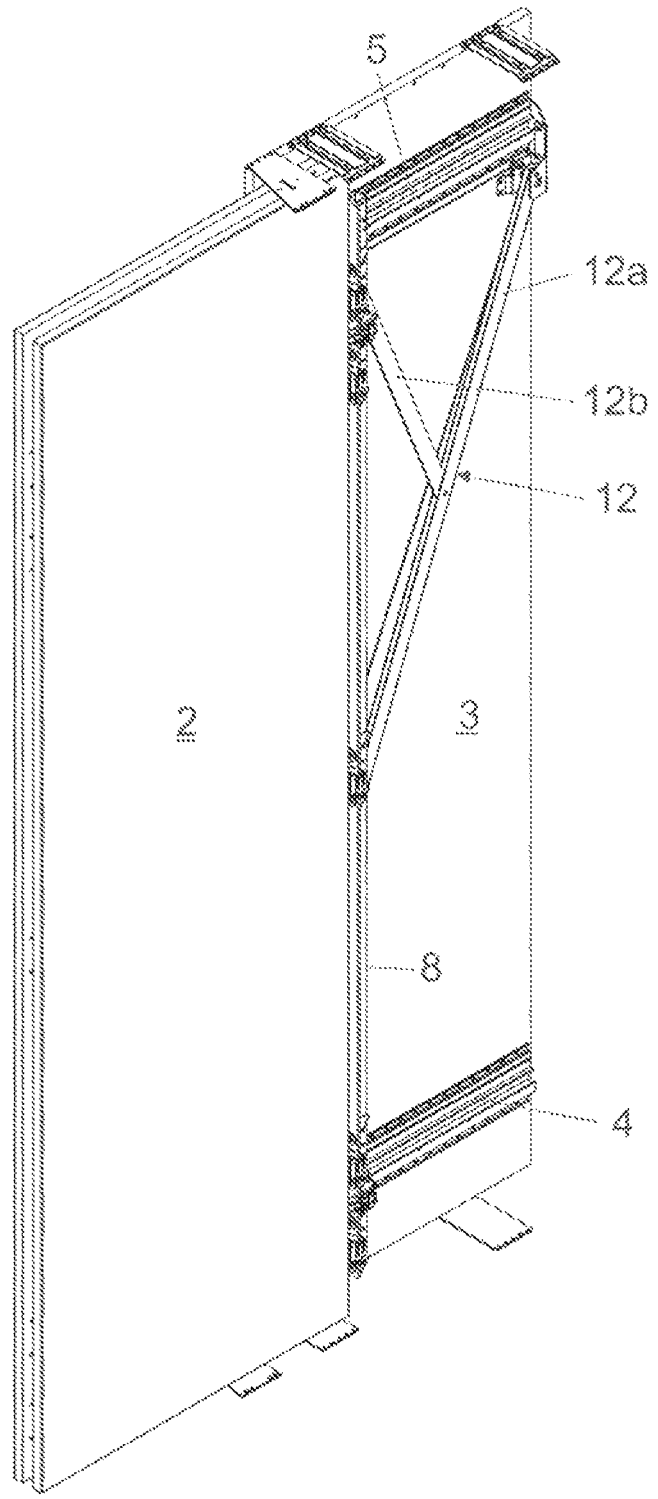
FIG. 4*d* is a perspective rear view of a further step of a method for installing an arrangement according to the invention.

In the method step represented in FIG. 4*d*, the securing devices 9 are transferred from the securing position to the release position. The carrier 8, and with it the folding sliding door 2, is now mounted displaceably on the guides 4, 5. The arrangement 1 is fully installed.

Figure 4E:
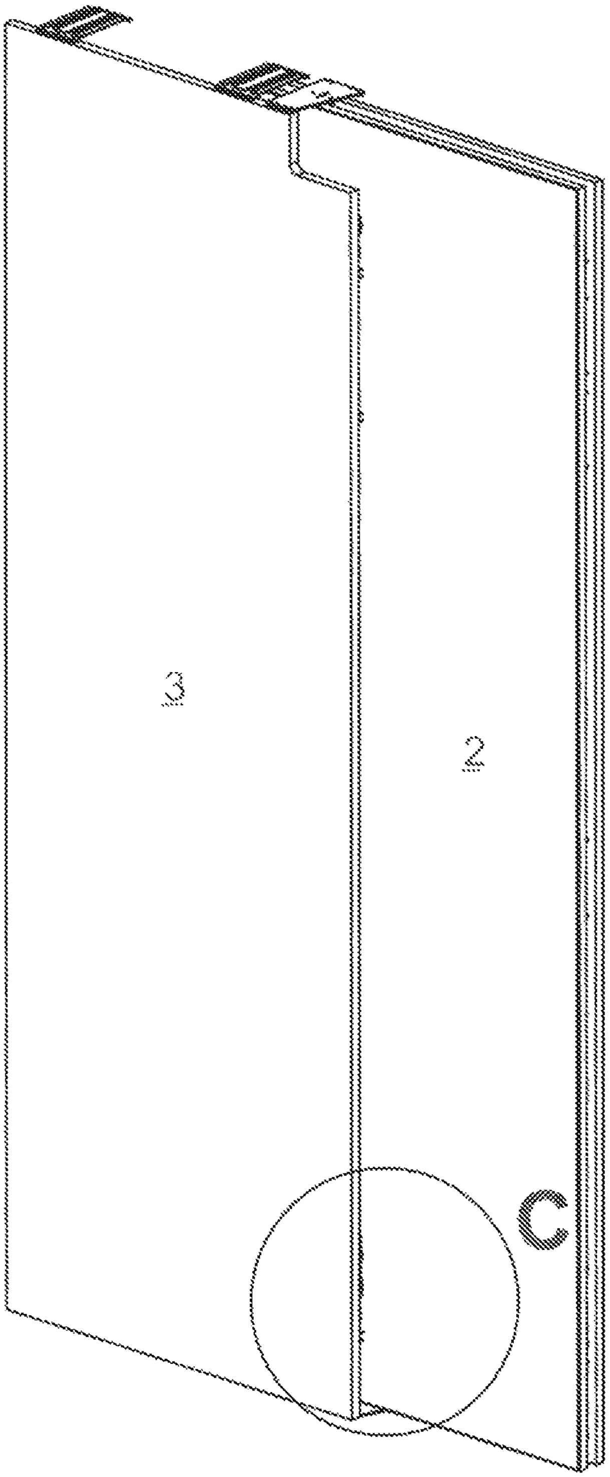
FIG. 4*e* is a perspective front view of a further step of a method for installing an arrangement according to the invention.

FIG. 4*e* shows the arrangement 1 again in the ready-installed state in a perspective view after a displacement of the folding sliding door 2. Detail C is represented in FIG. 6*f*.

FIG. 5*a* shows detail B from FIG. 4*a*. It can be seen that a deflection device 11*b* of the cable-pull device 11 is pre-installed on the carrier 8 in an upper region of this carrier 8. The deflection device 11*b* comprises a deflection roller. However, another means of deflecting the cable 11*a* can also be provided.

A guide body 7 is arranged on the carrier 8 via the deflection device 11*b* and, via this guide body 7, so is a securing device 9.

FIG. 5*b* shows detail A from FIG. 4*a*. Again, a guide body 6 is arranged on the carrier 8. Above the guide body 6, a securing device 9 is arranged on the carrier 8. A further deflection device 11*b* is installed on the securing device 9. This deflection device 11*b* is not fastened on the carrier 8.

The method is now to be explained again with regard to the securing devices 9 with reference to FIGS. 6*a* to 6*f*. FIGS. 6*a* to 6*f* in each case show the securing device 9 that is visible at the lower end of the carrier 8 and in FIG. 5*b*. The method essentially does not change for the other guide device 9 or, if more than two guide devices 9 are provided, for the other guide devices 9.

Figure 6A:
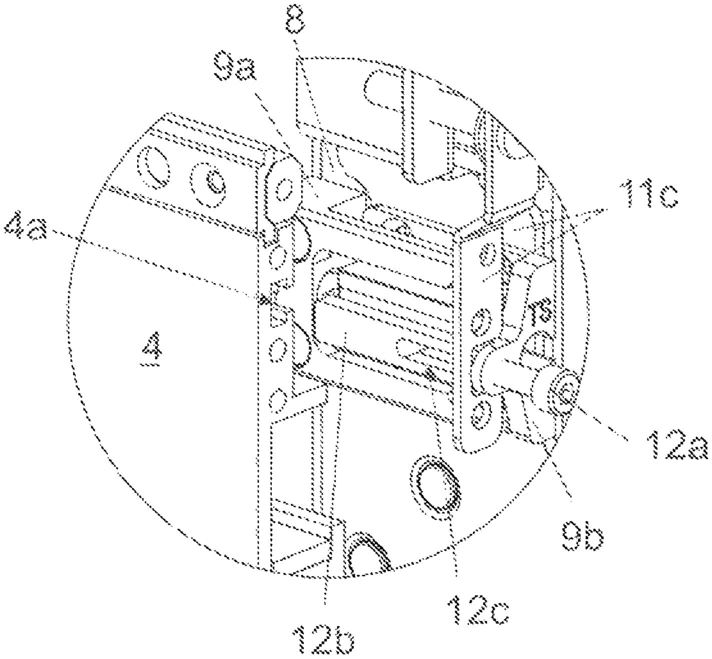
FIG. 6*a* is a perspective view of a securing device of an arrangement according to the invention in a step of a method for installing the arrangement.

FIG. 6*a* shows the securing device 9 before the guide body 6 has been inserted into the guide 4. In addition to the guide device 9, the guide 4 and the negative profile 4*a*, into which the profile 12*b* can be introduced, can be seen. The first installing body 9*a* is arranged on the carrier 8, the second installing body 9*b* is detachably connected to the first installing body 9*a* via the actuated securing element 9*c*. The deflection device 11*b* is arranged on the second installing body 9*b* and is not in direct contact with the carrier 8.

Through the profile 12*b* and the first installing body 9*a*, the securing device 9 can act as an insertion aid for inserting the guide body 6 into the guide 4.

Figure 6B:
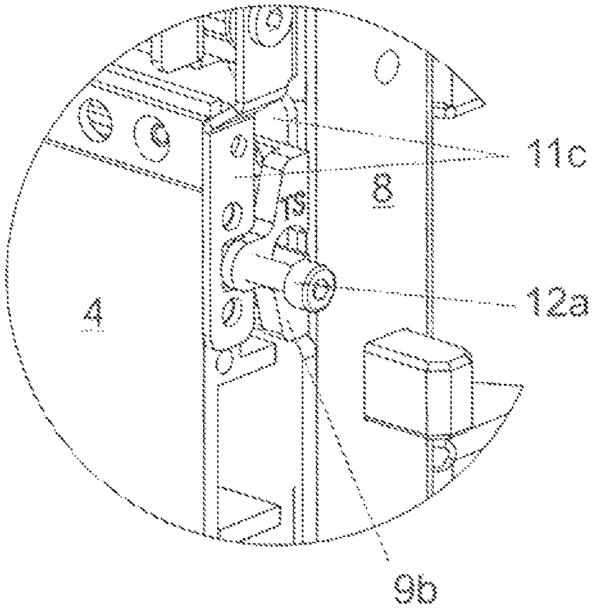
FIG. 6*b* is a perspective view of a securing device of an arrangement according to the invention in a further step of a method for installing the arrangement.

FIG. 6*b* shows the securing device 9 in a further method step. It can be seen that the guide body 6 is inserted into the guide 4. The profile 12*b* is inserted into the negative profile 4*a*. The fastening device 12 is not actuated.

Figure 6C:
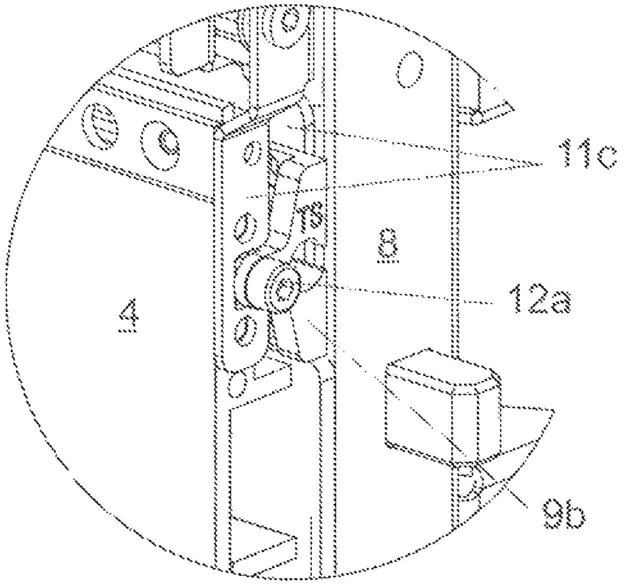
FIG. 6*c* is a perspective view of a securing device of an arrangement according to the invention in a further step of a method for installing the arrangement.

FIG. 6*c* shows the securing device 9 in a further method step. The fastening device 12 is actuated. The profile 12*b* has thus been spread in the spreading region 12*c* and thus produces a friction-locking connection between the second installing body 9*b* and the guide 4. The securing element 9*c* is furthermore actuated; therefore the securing device 9 is in the securing position.

Figure 6D:
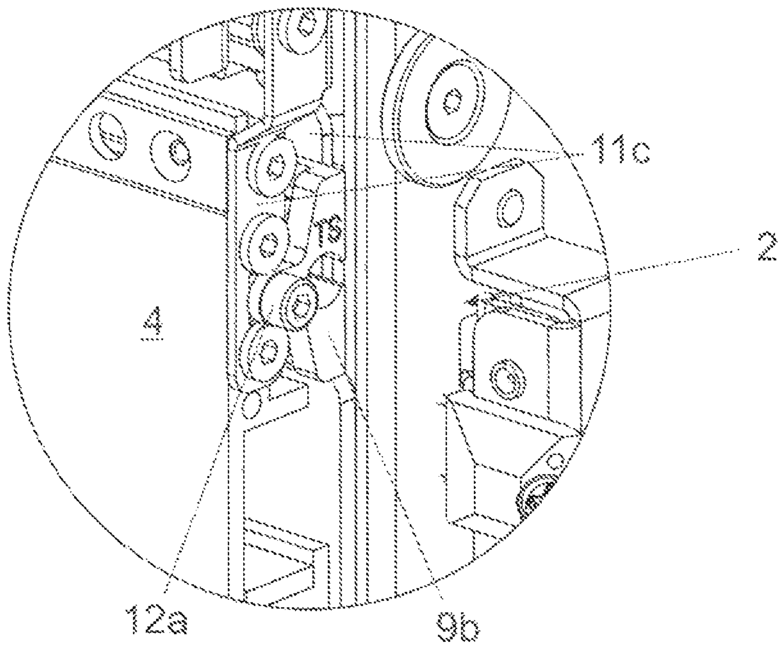
FIG. 6*d* is a perspective view of a securing device of an arrangement according to the invention in a further step of a method for installing the arrangement.

Following this, the method steps for shifting the arrangement into a state as represented in FIG. 4*b* are effected. During these method steps, the securing device 9 remains in the securing position. FIG. 6*d* shows the securing device 9 in the state represented in FIG. 4*b*. It can be seen that a folding sliding door 2 has been installed on the carrier 8.

Figure 6E:
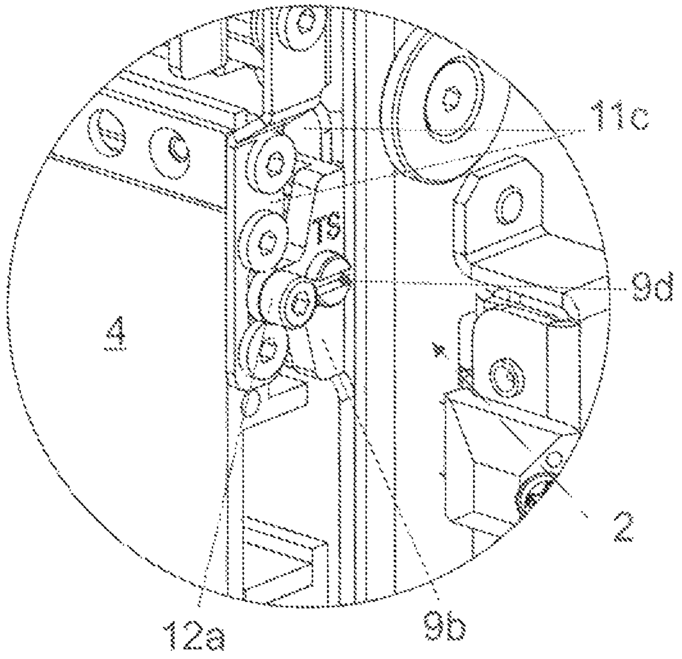
FIG. 6*e* is a perspective view of a securing device of an arrangement according to the invention in a further step of a method for installing the arrangement.
Figure 6F:
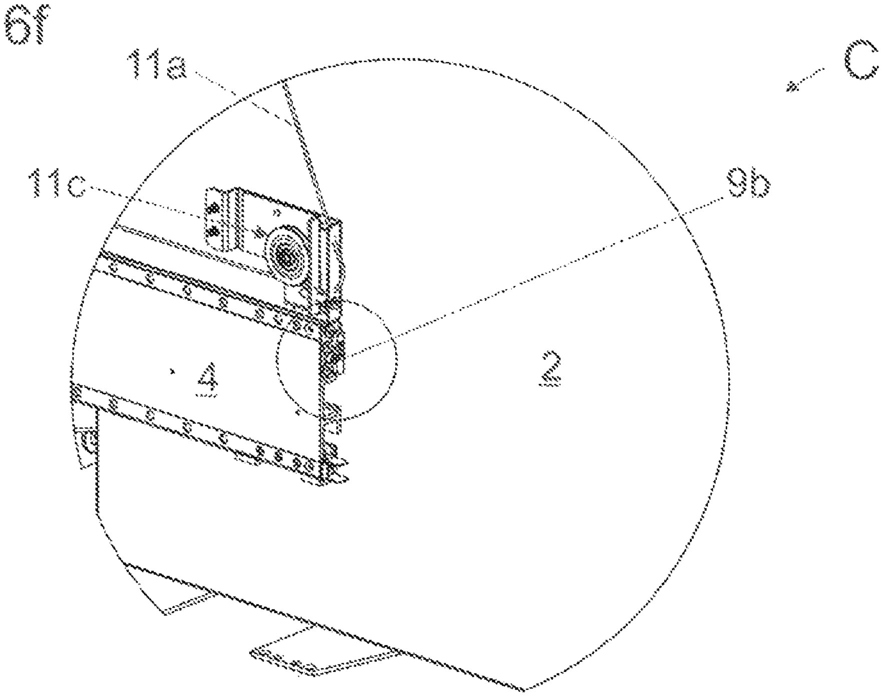
FIG. 6*f* shows detail C from FIG. 4*e*.

FIG. 6*e* shows the securing device 9 in a further method step. In this method step, the securing device 9 is transferred from the securing position to the release position. It can be seen that, for this, the securing element 9*c* has been actuated via the actuating device 9*d*. The carrier 8, and thus also the folding sliding doors 2, is mounted displaceably on the guides 6, 7 and thus on the furniture wall 3 via the guide bodies 6, 7. The arrangement 1 is ready-installed.

The securing device 9 can remain on the arrangement 1 and, in the case of a possible transport of the arrangement 1, can be used as a transport securing device.

Moreover, via the second installing body 9*b* of the securing device 9, a deflection device 11*b* is fastened on the guide 4 and thus on the furniture wall 3. This is illustrated again by FIG. 6*f*.

FIG. 6*f* shows detail C from FIG. 4*e*. It can be seen that the second installing body 9*b*, and thus the deflection device 11*b*, remains on the guide 4 during a displacement of the carrier 8 or of the folding sliding door 2.

Figure 7:
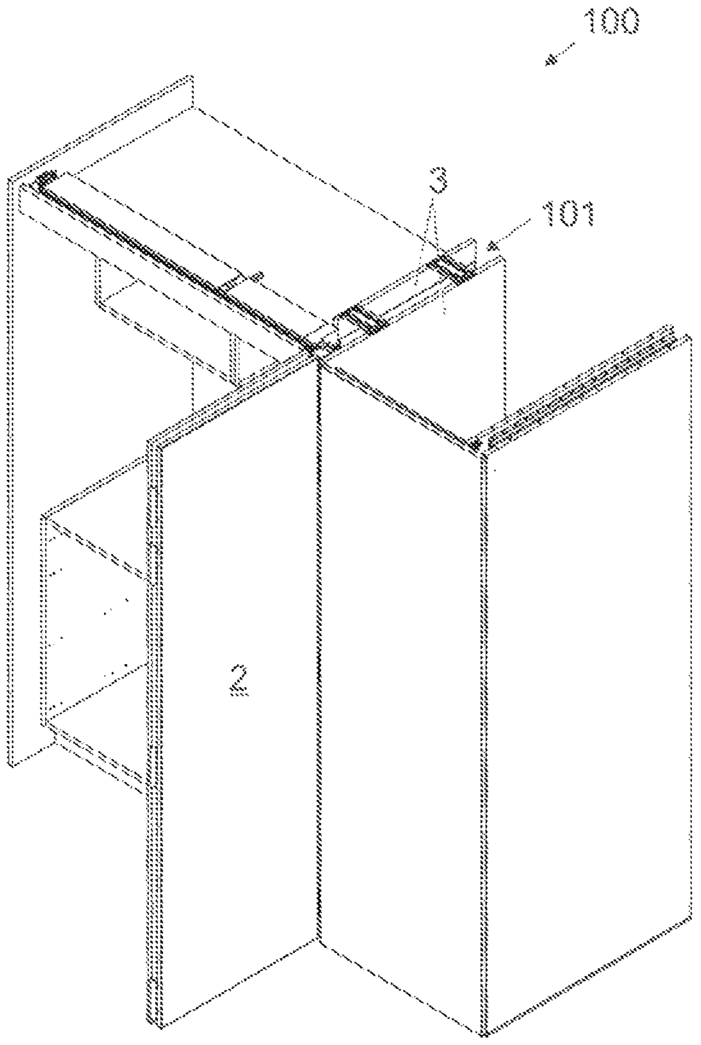
FIG. 7 shows a piece of furniture with an arrangement according to the invention.

A perspective view of a piece of furniture 100, which can comprise different component parts, for example several compartments inside the piece of furniture 100, is represented schematically in FIG. 7.

On the side of the piece of furniture 100, a cavity 101 is provided which is formed of two furniture walls 3 spaced apart from each other. A folding sliding door 2 can be lowered into this cavity 101 in the folded-up state. If the folding sliding door 2 is spread, it conceals the interior of the piece of furniture 100.

The folding sliding door 2 is composed of two door leaves, which are folded up in the positions according to FIG. 1. From this folded-up position, the folding sliding door 2 can be transferred to a spread position, in which the partial flaps form an angle which is greater than 0°.

A further part of the piece of furniture 100, for example a wardrobe, is arranged adjoining the cavity 101. If the folding sliding door 2 is in a spread position and the further part of the piece of furniture 100 is closed, the folding sliding door 2 and the further part of the piece of furniture 100 form a continuous furniture front.

Figure 8:
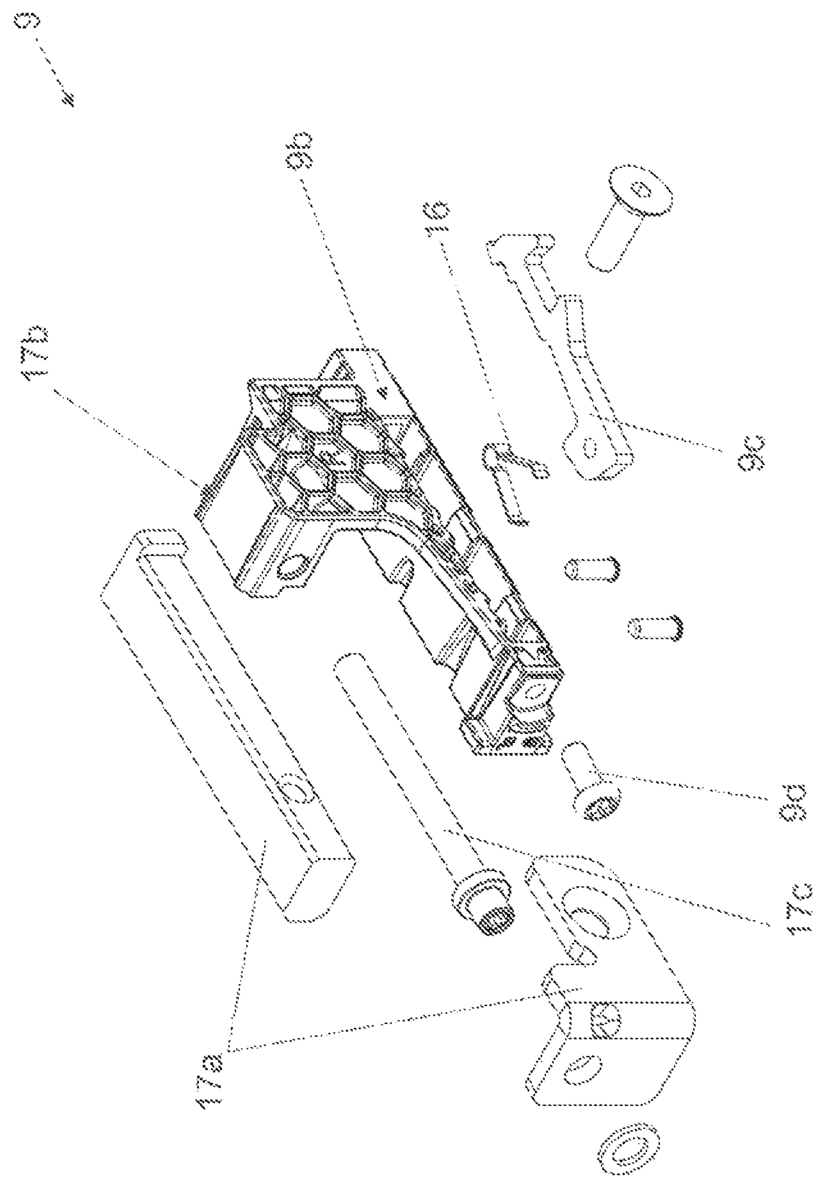
FIG. 8 is an exploded representation of an alternative embodiment of a securing device according to the invention with a setting device.

FIG. 8 shows an exploded representation of an alternative embodiment of a securing device 9 according to the invention with a setting device 6. An installing device 17*a* for installing the setting device 17 on a furniture wall 3 can be seen. A coupling device 17*b* and a second installing body 9*b* of a securing device 9 are formed with each other and in one piece.

An energy storage mechanism 16 in the form of a spring and a securing element 9*c* are arranged in the second installing body 9*b*, wherein a force is applied to the securing element 9*c* by the energy storage mechanism 16. The securing element 9*c* moreover has a ramp.

Furthermore, an actuating element 17*c* for actuating the setting device and an actuating element 9*d* for transferring the securing device 9 from a securing position to a release position can be seen.

Figure 9A:
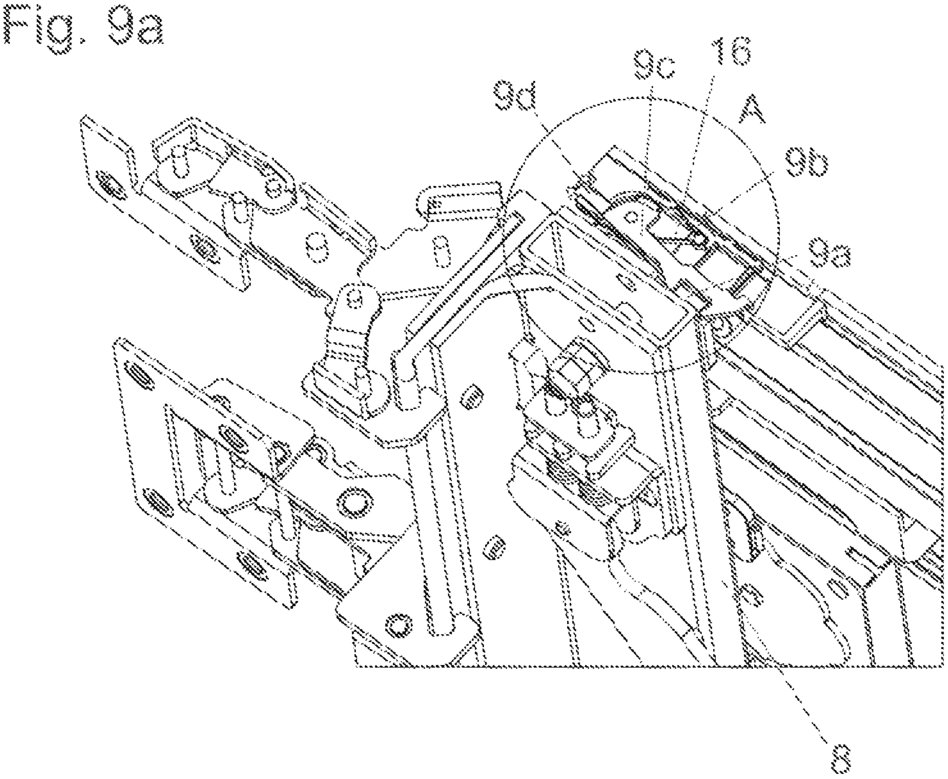
FIG. 9*a* shows a section through an arrangement with an alternative securing device according to the invention in a securing position.

FIG. 9*a* shows a section through an arrangement 1 with an alternative securing device 9 according to the invention in a securing position. It can be seen that the first installing body 9*a*, with which the securing element 9*c* is engaged, is connected to the carrier 8.

The first installing body 9*a* arranged on the carrier 8 can traverse a ramp of the securing element 9*c* and can thus lower the securing element 9*c* in the second mounting body 9*b* against the force applied by the energy storage mechanism 16. After the ramp of the securing element 9*c* has been traversed, the first installing body 9*a* enters into engagement with the recess of the securing element 9*c*. The securing device 9 is then in the securing position.

Figure 9B:
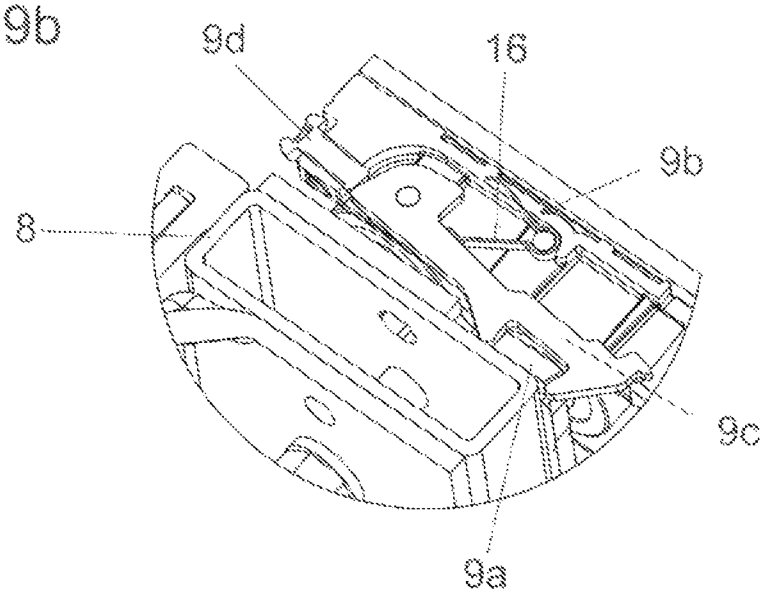
FIG. 9*b* shows detail A from FIG. 9*a* with an alternative securing device according to the invention in a securing position.

FIG. 9*b* shows detail A from FIG. 9*a* with an alternative securing device 9 according to the invention in a securing position. It can again be seen how the securing element 9*c* is engaged with the first installing body 9*a* and is held in the securing position by the energy storage mechanism 16.

LIST OF REFERENCE NUMBERS

1 arrangement
2 sliding/folding sliding door
3 furniture wall
4 guide
4*a* profile
5 guide
6 guide body
7 guide body
8 carrier
9 securing device
  9*a* first installing body
  9*b* second installing body
  9*c* securing element
  9*d* actuating element
  9*e* securing pins
10 compensation device
11 cable-pull device
  11*a* cable
  11*b* deflection device
12 pivot lever mechanism
  12*a* first pivot lever
  12*b* second pivot lever
13 guide
14 fastening device of the securing device
  14*a* screw
  14*b* profile
  14*c* spreading section
15 opening 15*a* recess
16 energy storage mechanism
17 setting device
17*a* installing device
17*b* coupling device
17*c* actuating element
100 piece of furniture
101 cavity

The invention claimed is:

1. An arrangement for guiding a sliding door or a folding sliding door on a furniture wall, the arrangement comprising:

at least two guides to be fastened on the furniture wall;

a carrier, on which the sliding door or the folding sliding door is to be fastened;

at least two guide bodies;

at least one securing device; and a compensation device for compensating for a tilt moment of the carrier or the sliding door or the folding sliding door arranged thereon about a tilt axis, wherein:

the carrier is mounted displaceably on the at least two guides via the at least two guide bodies, respectively;

the at least one securing device comprises at least one securing element, a first installing body that is connected to the carrier, and a second installing body that is connected to one of the at least two guides;

the at least one securing element is configured to fix the first installing body and the second installing body relative to each other in a securing position and release the first installing body and the second installing body in a release position;

in the release position, the first installing body and the second installing body are movable relative to each other; and the carrier and the at least two guide bodies are different parts and are separate from each other;

the compensation device has at least one cable-pull device or at least one pivot lever mechanism; and the at least one pivot lever mechanism comprises at least two pivot levers connected to each other, the at least two pivot levers being pivotable relative to each other during a movement of the carrier via the at least two guides and the at least two guide bodies along the furniture wall.

2. The arrangement according to claim 1, wherein the at least one securing device comprises an energy storage mechanism for applying a force to the at least one securing element.

3. The arrangement according to claim 2, wherein the energy storage mechanism is a spring.

4. The arrangement according to claim 1, wherein the first installing body or the second installing body or the at least one securing element is in one piece.

5. The arrangement according to claim 4, wherein the first installing body and the second installing body and the at least one securing element are in one piece.

6. The arrangement according to claim 1, wherein the first installing body or the second installing body or the at least one securing element is in several parts.

7. The arrangement according to claim 1, wherein the first installing body and the second installing body or the at least one securing element are made of a same material.

8. The arrangement according to claim 7, wherein the same material is plastic or metal.

9. The arrangement according to claim 7, wherein the different materials are plastic or metal.

10. The arrangement according to claim 7, wherein the first installing body and the second installing body and the at least one securing element are made of the same material.

11. The arrangement according to claim 1, wherein the first installing body and the second installing body or the at least one securing element are made of different materials.

12. The arrangement according to claim 11, wherein the first installing body and the second installing body and the at least one securing element are made of the different materials.

13. The arrangement according to claim 1, wherein the at least one securing device has an actuating element for actuating the at least one securing device.

14. The arrangement according to claim 13, wherein the actuating element is a screw head drive.

15. The arrangement according to claim 13, wherein the actuating element is arranged on the at least one securing element.

16. The arrangement according to claim 1, wherein the at least one securing element is a pivot lever, or comprises at least one ramp via which the at least one securing element is configured to be traversed by the first installing body.

17. The arrangement according to claim 16, wherein the at least one securing element is the pivot lever, and comprises the at least one ramp.

18. The arrangement according to claim 1, further comprising at least one setting device for adjusting the one of the at least two guides relative to the furniture wall.

19. The arrangement according to claim 18, wherein:

the at least one setting device comprises at least one installing device that is configured to be fastened on the furniture wall and at least one coupling device that is coupled to the one of the at least two guides; and the arrangement further comprises at least one actuating element for adjusting the at least one coupling device relative to the at least one installing device.

20. The arrangement according to claim 19, wherein the actuating element is rotatably mounted.

21. The arrangement according to claim 1, wherein the at least one securing device comprises at least two securing devices.

22. The arrangement according to claim 1, wherein the compensation device has the at least one pivot lever mechanism and the at least two pivot levers are arranged in a common center plane.

23. A piece of furniture comprising:

at least one furniture wall, at least one sliding door or at least one folding sliding door; and the arrangement according to claim 1.

24. The arrangement according to claim 1, wherein the carrier has at least one guide for displaceable mounting of one end of at least one of the at least two pivot levers.

25. The arrangement according to claim 24, wherein the at least one guide of the carrier is arranged substantially in a center on the carrier or extends substantially over a fifth of an entire length of the carrier.

26. The arrangement according to claim 1, wherein the compensation device has the at least one cable-pull device and the at least one cable-pull device has at least one cable which is fastened on the carrier at one end.

27. The arrangement according to claim 26, wherein the at least one cable-pull device has at least one cable-tensioning device for setting a tension of the at least one cable of the at least one cable-pull device.

28. The arrangement according to claim 27, wherein the at least one cable-tensioning device is arranged on the carrier.

29. The arrangement according to claim 26, wherein the at least one cable-pull device has at least one deflection device for deflecting the at least one cable of the at least one cable-pull device.

30. The arrangement according to claim 29, wherein the at least one deflection device comprises a deflection roller.

31. The arrangement according to claim 29, wherein the at least one deflection device is arranged on one end of at least one of the at least two pivot levers or arranged on one of the at least two guides or configured to be arranged on the furniture wall or arranged on the second installing body.

32. The arrangement according to claim 29, wherein the at least one deflection device is arranged on one end of at least one of the at least two pivot levers and arranged on one of the at least two guides and configured to be arranged on the furniture wall and arranged on the second installing body.

33. The arrangement according to claim 26, wherein the at least one cable is only one cable.

34. The arrangement according to claim 26, wherein:

the one end is a first end of the at least one cable; and the at least one cable is fastened on the carrier at a second end.

35. The arrangement according to claim 1, wherein the compensation device is at least partially pre-installed on the carrier.

36. The arrangement according to claim 35, wherein the compensation device is completely pre-installed on the carrier.

37. The arrangement according to claim 1, wherein the at least one securing device is at least partially pre-installed on the carrier.

38. The arrangement according to claim 37, wherein the at least one securing device is completely pre-installed on the carrier.

39. The piece of furniture according to claim 23, wherein the at least one furniture wall at least partially delimits a cavity of the piece of furniture which is configured to receive the at least one sliding door or the at least one folding sliding door.

40. The arrangement according to claim 1, wherein the second installing body is configured to be connected to the furniture wall.

41. The arrangement according to claim 1, wherein the second installing body is connected to the at least one securing element.

42. The arrangement according to claim 1, wherein each of the first installing body and the second installing body and the at least one securing element is in several parts.

43. The arrangement according to claim 1, wherein the compensation device is for compensating for the tilt moment of the carrier and the sliding door or the folding sliding door arranged thereon about the tilt axis.

44. The arrangement according to claim 1, wherein the compensation device has the at least one cable-pull device and the at least one pivot lever mechanism.

45. A method for installing an arrangement for guiding a sliding door or a folding sliding door on a furniture wall, the arrangement comprising:

at least one guide to be fastened on the furniture wall;

a carrier, on which the sliding door or the folding sliding door is to be fastened;

at least one guide body; and at least one securing device, wherein:

the carrier is mounted displaceably on the at least one guide via the at least one guide body;

the at least one securing device comprises at least one securing element, a first installing body that is connected to the carrier, and a second installing body that is connected to the at least one guide;

the at least one securing element is configured to fix the first installing body and the second installing body relative to each other in a securing position and release the first installing body and the second installing body in a release position;

in the release position, the first installing body and the second installing body are movable relative to each other; and the carrier and the at least one guide body are different parts and are separate from each other, the method comprising:

fastening the at least one guide on the furniture wall;

connecting the carrier to the at least one guide via the at least one guide body;

connecting the second installing body to the at least one guide or the furniture wall;

transferring at least two pivot levers of at least one pivot lever mechanism from a parallel position, in which the at least two pivot levers are arranged substantially parallel to each other, to at least one spread position, in which an angle between the at least two pivot levers is greater than 0°, and transferring the at least one securing device from the securing position to the release position.

46. The method according to claim 45, further comprising, before the at least one securing device is transferred from the securing position to the release position, setting a cable tension of at least one cable of at least one cable-pull device.

47. The method according to claim 45, further comprising installing the sliding door or the folding sliding door on the carrier.

48. The method according to claim 45, further comprising unwinding at least one cable-pull device from a cable supply.

49. The method according to claim 45, wherein the second installing body is connected to the at least one guide and the furniture wall.

* * * * *